Nov. 21, 1939.  R. E. BASSETT, JR  2,180,948
SEQUENTIAL CONTROLLER
Filed May 8, 1936  5 Sheets-Sheet 1
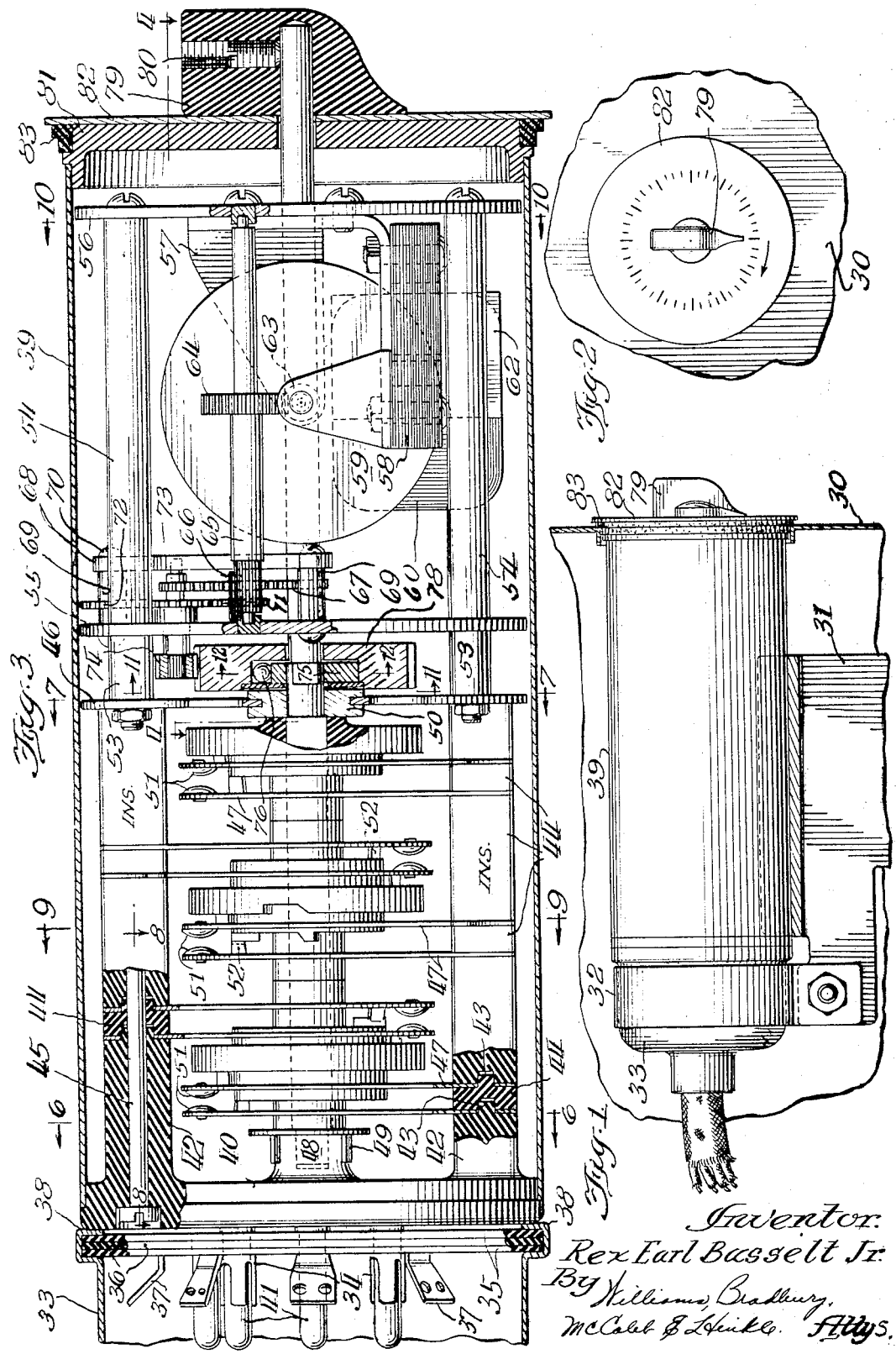
Inventor:
Rex Earl Bassett Jr.
By Williams, Bradbury,
McCaleb & Hinkle. Attys.

Nov. 21, 1939.  R. E. BASSETT, JR  2,180,948
SEQUENTIAL CONTROLLER
Filed May 8, 1936  5 Sheets-Sheet 2
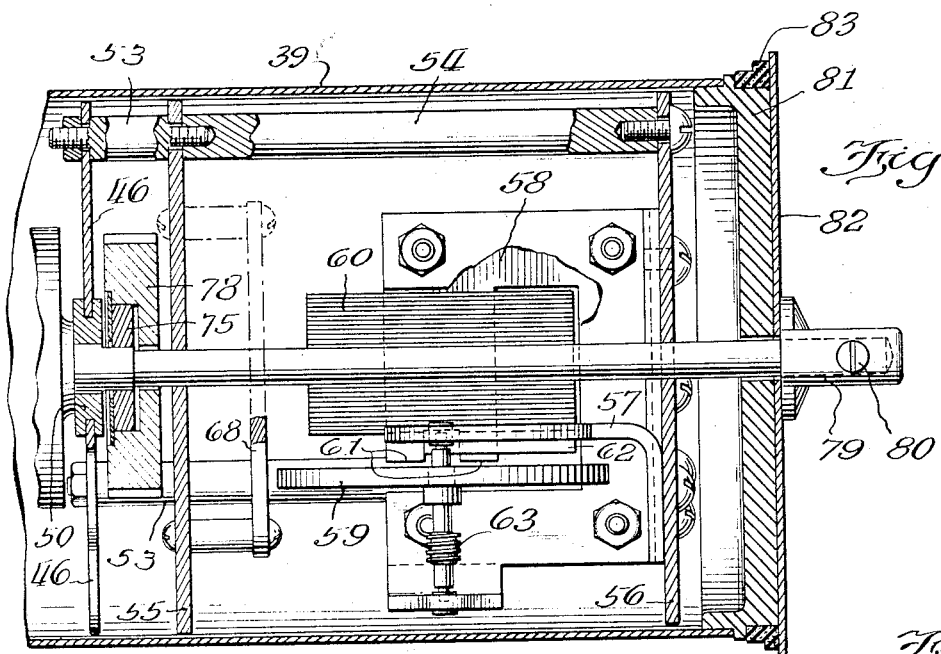
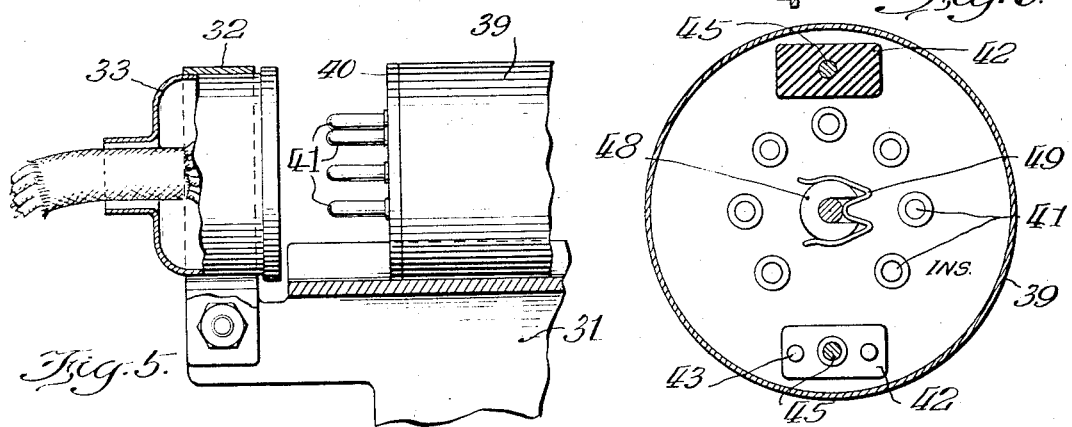
Inventor:
By Rex Earl Bassett Jr.
Williams, Bradbury, McCaleb & Hinkle
Attys.

Nov. 21, 1939.  R. E. BASSETT, JR  2,180,948
SEQUENTIAL CONTROLLER
Filed May 8, 1936  5 Sheets-Sheet 3
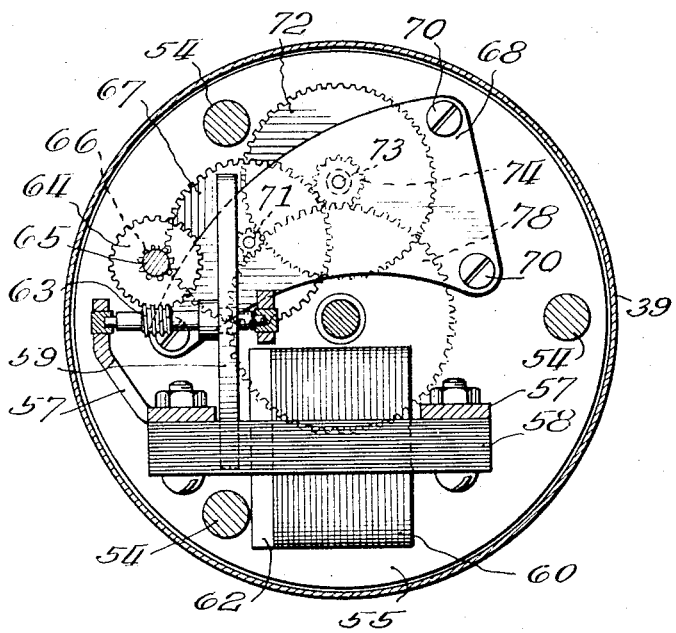
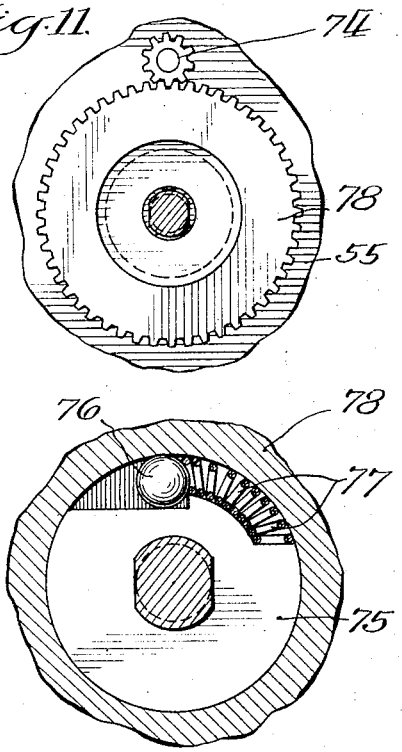
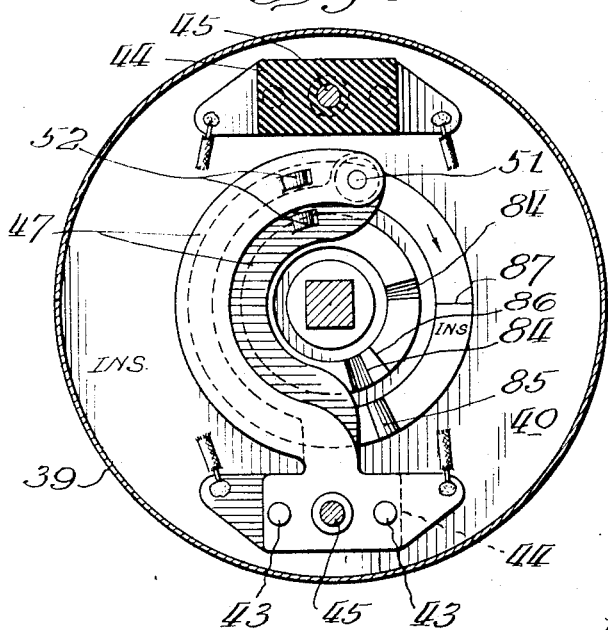
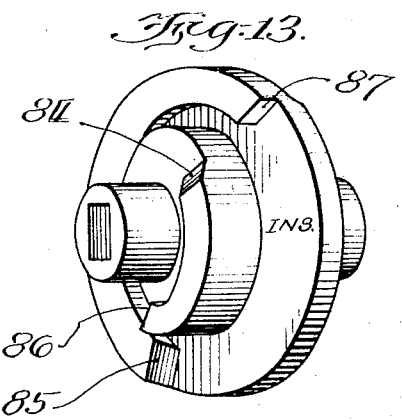
Inventor:
Rex Earl Bassett Jr
By Williams, Bradbury, McCaleb & Hinkle
Attys.

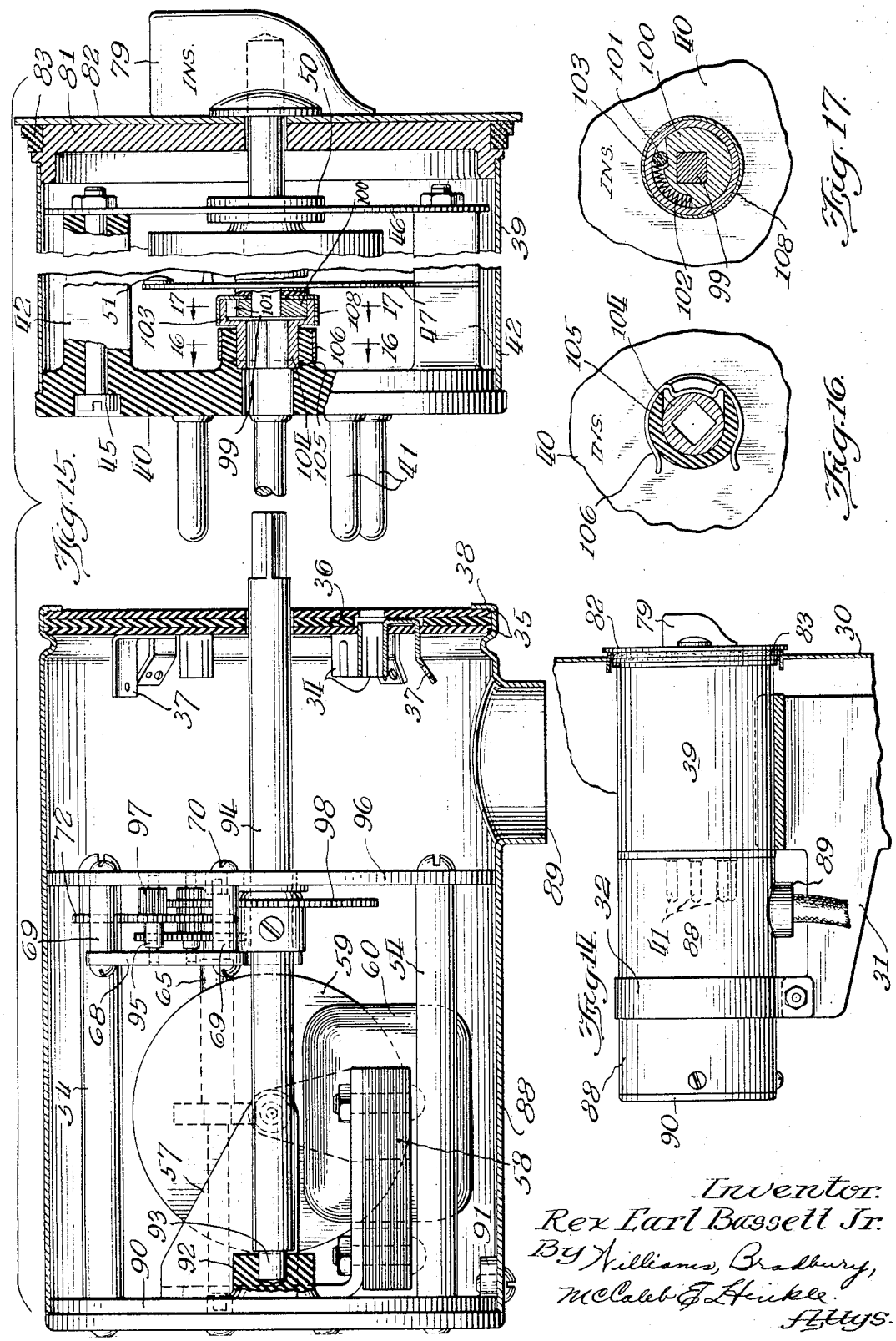

Nov. 21, 1939. R. E. BASSETT, JR 2,180,948
SEQUENTIAL CONTROLLER
Filed May 8, 1936 5 Sheets-Sheet 5
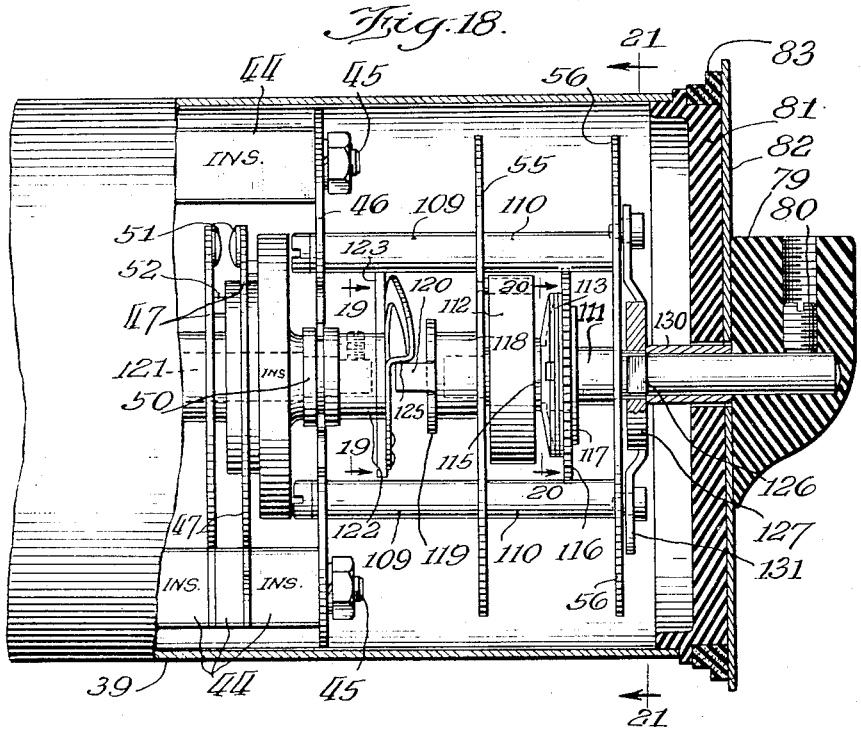
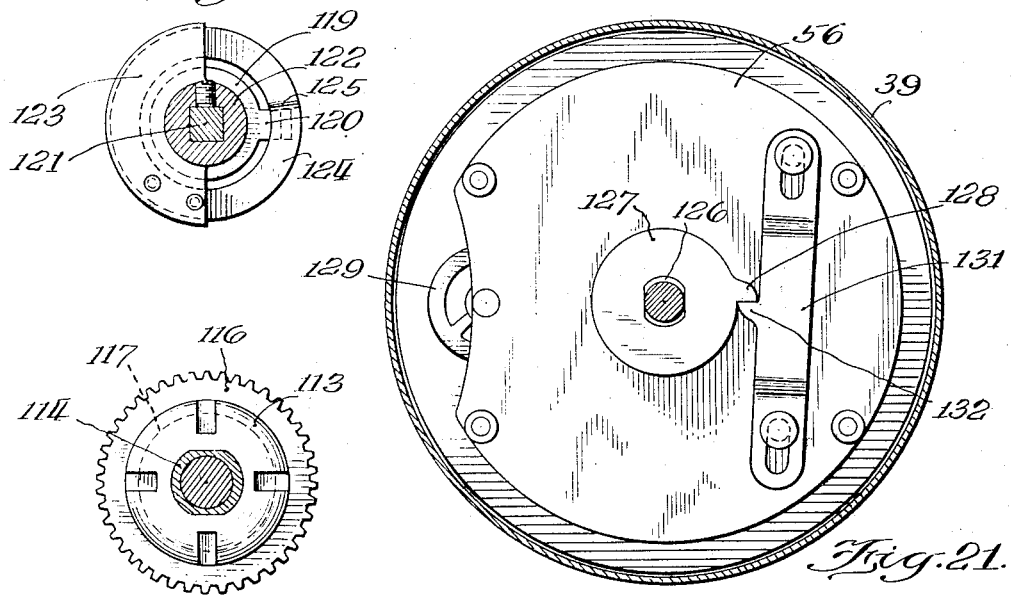
Inventor.
Rex Earl Bassett Jr.
By Williams, Bradbury, McCaleb & Hinkle
Attys.

Patented Nov. 21, 1939

2,180,948

UNITED STATES PATENT OFFICE 2,180,948

SEQUENTIAL CONTROLLER

Rex Earl Bassett, Jr., Detroit, Mich., assignor, by mesne assignments, to Bendix Home Appliances, Inc., South Bend, Ind., a corporation of Delaware Application May 8, 1936, Serial No. 78,635

13 Claims. (Cl. 200—92)

The invention relates to a sequential controller for automatic washing machines and other automatically-controlled machines, and its principal object is to provide a controller that is compact, inexpensive to manufacture, and easy to keep in repair. More specific objects and advantages are apparent from the description, in which reference is had to the accompanying drawings illustrating a preferred embodiment of the invention.

Figure 1 is a fragmentary vertical section of a cabinet showing a preferred form of sequential controller mounted therein;

Figure 2 is a fragmentary elevation of the cabinet showing the front of the sequential controller;

Figure 3 is a longitudinal vertical section on a larger scale of the sequential controller;

Figure 4 is a fragmentary horizontal section thereof taken on the line 4—4 of Figure 3;

Figure 5 is a view similar to Figure 1 but partly in section and showing the sequential controller partly withdrawn from its normal position;

Figure 6 is a vertical transverse section on a smaller scale taken on the line 6—6 of Figure 3;

Figure 7 is a vertical transverse section on a smaller scale taken on the line 7—7 of Figure 3;

Figure 8 is a fragmentary horizontal section taken on the line 8—8 of Figure 3;

Figure 9 is a transverse vertical section taken on the line 9—9 of Figure 3;

Figure 10 is a transverse vertical section taken on the line 10—10 of Figure 3;

Figure 11 is a fragmentary vertical section taken on the line 11—11 of Figure 3;

Figure 12 is a fragmentary vertical section on a larger scale taken on the line 12—12 of Figure 3;

Figure 13 is a perspective of one of the cams for actuating the contacts;

Figure 14 is a fragmentary vertical section of a cabinet showing a modified form of sequential controller mounted therein;

Figure 15 is an exploded vertical longitudinal section on a larger scale of the sequential controller of Figure 14;

Figure 16 is a fragmentary vertical section taken on the line 16—16 of Figure 15;

Figure 17 is a fragmentary vertical section taken on the line 17—17 of Figure 15;

Figure 18 is a fragmentary vertical section showing the front portion of a further modified form of sequential controller;

Figure 19 is a fragmentary vertical section taken on the line 19—19 of Figure 18;

Figure 20 is a fragmentary vertical section taken on the line 20—20 of Figure 18; and Figure 21 is a vertical transverse section taken on the line 21—21 of Figure 18.

These specific drawings and the specific description that follows are to disclose and illustrate the invention and are not to impose limitations upon the claims.

A sequential controller, constructed in accordance with the invention, comprises a drive shaft and controlling mechanism, which are preferably held by a common demountable support or housing. When the controlling mechanism is provided with a dial shaft connected therewith and extending therefrom through the wall of the cabinet containing the automatic machine to be controlled, the common support for the drive shaft and controlling mechanism may be demountable through the wall of the cabinet.

In the case of an electric sequential controller, the electric controlling mechanism may be contained in a housing having a set of connectors mounted at one side thereof and connected with the controlling mechanism. Then if a set of fixed connectors for registry with the former connectors are provided, the controller can be completely disconnected or connected by mere removal or replacement of the housing and its connectors. The contacts connected with the electrical controlling mechanism are mounted at the inner end of the housing for that mechanism, when the mechanism is removable through the wall of the cabinet containing the automatic machine. If the connectors are in the form of prongs and sockets or other plug-in devices, plug-in driving and driven connections for the controlling mechanism may be associated therewith so that they are connected and disconnected simultaneously with the connectors, as in the device shown in Figures 15, 16 and 17.

A sequential controller provided with a dial shaft or with a main driven shaft may be driven in accordance with the invention by means of a drive shaft substantially transverse to the main driven or dial shaft, which has a prime mover mounted thereon. This construction is particularly advantageous when power is transmitted from the drive shaft to the controlling mechanism by means of a one-way driving connection and when the controlling mechanism is movable in the same direction by manual rotation of the dial shaft, as by transmission of power from the drive shaft.

An advantageous construction in accordance with the invention includes a device such as a one-way driving connection for transmitting power from the drive shaft to the controlling mechanism, and shiftable stop mechanism associated with the drive shaft to permit it to turn in either direction one complete revolution, corresponding to one complete cycle of operation of the controlling mechanism. Such a construction is illustrated in Figures 18 to 21.

In the specific apparatus illustrated in the drawings, the sequential controller is accessible through a wall 30 of a cabinet housing an automatic washing machine or other device to be controlled. A fixed bracket 31 supports the body of the controller and guides it when it is pushed into place through the wall 30 of the cabinet. Secured by means of a bolt and nut to the rear end of the bracket 31 is a clamp 32 for holding the aluminum shell 33 of a multiple electric socket. The individual sockets 34 (see Figure 3) are fixed in a pair of Bakelite plates 35 extending across the front of the shell 33 and spaced apart by means of an intermediate Bakelite plate 36. Connected to each of the individual sockets 34, by means of a metallic strip extending between the pair of Bakelite plates 35, is a soldering post 37 for attachment to a lead-in wire. The shell 33 is provided with tongues 38 that are turned down to secure the Bakelite plates 35 and 36 in place.

The sequential controller is housed in a cylindrical aluminum shell 39. Fitting into the rear end of the cylindrical shell 39 is a circular molded Bakelite block 40, having connector prongs 41 fixed therein and extending from its outer face, to fit the individual sockets 34. A pair of rectangular posts 42 are formed integral with the inner side of the circular Bakelite block 40 and are provided with pairs of lugs 43 (see Figure 8) that fit into recesses in rectangular Bakelite blocks 44. In turn, the rectangular blocks 44 have lugs that fit into sockets in further rectangular blocks, and there are four interlocking rectangular blocks mounted upon one of the rectangular posts 42 and six interlocking rectangular blocks mounted upon the other post 42. Each of the posts and blocks is provided with a central bore, and a through bolt 45 is used to hold each of the two assemblies together and to hold a brass center plate 46 across the inner ends of the two assemblies (see Figure 4). A resilient brass contact finger 47 is secured in each of the lug and socket joints in the two assemblies, and is provided with apertures through which the lugs 43 and bolt 45 extend (see Figure 9). Integral with the portion of each contact finger 47, that is held between the rectangular blocks, is a laterally extending soldering post for connection with a wire that leads to one of the connector prongs 41.

In addition to the rectangular post 42, there is provided integral with the inner side of the circular Bakelite block 40, a bearing socket 48, which is open on one side (see Figure 6). The main shaft of the electrical controller has one end journaled in the bearing socket 48 and retained therein by means of a spring clip 49, and has another portion journaled in a bearing bushing 50 fixed in the center plate 46 (see Figure 7). The portion of the main shaft between the bearing socket 48 and the bearing bushing 50 is square and passes through square sockets in three molded Bakelite cams for actuating the contacts. The front cam opens and closes the silver contacts 51 on one pair of contact fingers 47, and each of the other two cams actuates two pairs of contact fingers 47, one pair of contact fingers being arranged at the inner side, and one pair at the outer side of each of the two cams. Each of the contact fingers 47 is provided with a leg 52, which rides on the face of a cam. Thus each of the cams is provided with two annular and concentric camming surfaces on each working face.

Three short steel spacing posts 53 are provided with reduced threaded portions at each end, and the threaded portions at the inner ends of the posts are provided with nuts that secure the posts to the brass center plate 46, while the threaded portions at the outer ends are screwed into threaded sockets in the inner ends of long spacing posts 54, which hold an inner brass bearing plate 55 against the outer ends of the short spacing posts 53. By means of screws threaded into sockets in the outer ends of the long spacing posts 54, an outer bearing plate 56 of steel is held against the outer ends of the posts.

A steel bearing bracket 57 for the drive shaft is screwed to the inner side of the outer bearing plate 56 (see Figure 4). Bolted to the lower side of the bearing bracket 57 is a laminated core 58 which is closed except for a narrow air gap. Extending into this air gap is a copper armature 59 fixed upon the drive shaft. A coil 60, made of 5000 turns of No. 35 wire wound on a paper form, surrounds a leg of the core 58 adjacent to the air gap. In order to produce an ordinary shaded pole motor, the portion of the core 58, adjacent the air gap, which protrudes from the coil 60, is formed into a pair of forks 61, one of which is surrounded by a copper shading plate 62.

Formed on the drive shaft is a worm 63, which drives a Bakelite worm wheel 64 (see Figure 3) fixed on a secondary shaft 65 that has its ends journaled in the inner and outer bearing plates 55 and 56. A pinion 66 is cut on the inner end of the secondary shaft 65 for driving a gear 67, which is pressed on a stub shaft having one end journaled in the inner bearing plate 55, and the other end journaled in an intermediate brass bearing plate 68. This plate is supported from the inner bearing plate 55 by means of short posts 69 having threaded sockets in their ends to receive screws 70. Cut on the stub shaft adjacent the gear 67 is a secondary pinion 71 (see Figure 10), which drives a secondary gear 72 fixed on a secondary stub shaft 73 (see Figure 3), similarly journaled in the two plates 55 and 68. The stub shaft, on which the secondary gear 72 is mounted, extends inward through the inner bearing plate 55 and has pressed on its end a pinion 74 (see Figure 11) for transmitting the drive to the main shaft of the mechanism.

In order to produce an overrunning clutch, a stamping 75 (see Figure 12) pressed on the main shaft adjacent the bearing bushing 50, is associated in the usual manner with a ball 76, spring 77 and a housing 78. The housing 78 is free to turn upon the shaft except when it is locked thereon by the agency of the ball 76 and an annular steel cover plate is pressed into the inner side of the housing to retain the ball and spring. A portion of the main shaft extends outward from the controlling mechanism through apertures in the bearing plates 55 and 56 and constitutes a dial shaft. On the protruding end of this shaft a Bakelite indicator 79 (see Figure 3) is fixed by means of a set screw 80. The indicator on the end of the shaft holds a circular molded Bakelite cover 81 on the front end of the cylindrical shell 39, and a dial 82 is interposed between the indicator 79 and the cover 81, being secured to the front surface of the cover. Surrounding the periphery of the cover 81 is a rubber gasket 83 for contacting the wall 30 of the cabinet.

Each of the pairs of contact fingers 47 is actuated by the two annular camming surfaces on one working face of a cam The contact finger nearest the working face is actuated by the outer annular camming surface, and the finger farthest from the working face is actuated by the inner of the two annular camming surfaces As the cams rotate, each of the contact fingers 47 drops off a sharply vertical portion of its camming surface from time to time. The dropping of the contact finger closest to the working face of the cam causes opening of the contacts and the dropping of the contact finger farthest from the working face of the cam causes closing of the contacts.

After the contacts have been opened, and before the contacts are again closed by the dropping of the contact finger farthest from the working face, it is obvious that the outer contact finger must be lifted away from the working face of the cam. Lifting of that contact finger is accomplished by means of a gently sloping rise 84 (see Figure 13) in the annular camming surface up which the leg 52 of that contact finger rides as the cam rotates. Simultaneously with or after the rise of the outside contact finger, an elevation of the inner contact finger away from the working surface of the cam is accomplished by means of a similar gentle rise 85 in the annular camming surface that operates the inner contact finger. Both of the contact fingers having thus been lifted away from the working surface of the cam, their position is such that the dropping of the outer contact finger, as its leg arives at one of the vertical portions 86 in its camming surface, causes the closing of the contacts. The next movement of the contact fingers in their operation is the dropping of the inner contact finger off one of the vertical portions 87 in its camming surface, which causes the opening of the contacts.

The circuit that furnishes the current for the coil 60 of the shaded pole motor is preferably closed by one pair of the contacts 51 and is kept closed by the cam operating that pair of contacts for nearly the complete rotation of the cam. At the beginning of each operation of the machine controlled by the mechanism, the main shaft is merely rotated by means of the indicator 79 an amount just sufficient to close the pair of contacts through which the current flows to the shaded pole motor. The shaded pole motor then continues to rotate the main shaft at a slow rate of speed for nearly a complete revolution.

At the end of the operation of the machine, the pair of contacts controlling the shaded pole motor are opened by means of their cam and the controlling mechanism comes to rest. The operator can again close that pair of contacts by a slight forward rotation of the main shaft, and start the mechanism upon a new cycle of operation.

Because of the overrunning clutch, the cams cannot be rotated backward by means of the indicator 79, the pitch of the Bakelite worm wheel 64 being small enough so that the gearing is irreversible. Obviously, backward rotation of the cams would cause damage to the mechanism. The overrunning clutch moreover makes it possible for the main shaft to be rotated forward by hand independently of the shaded pole motor and associated gearing. Thus the operation of the controlling mechanism and the controlled machine can be hastened by the operator at any time. The cams are, of course, cut in such a manner that the various pairs of contacts are opened and closed at the proper moments in the cycle of operation, to open and close various circuits employed in the controlling of the automatic machine. The wires connected to the various contact fingers are omitted from most of the figures for the sake of clarity.

Figure 14 shows a sequential controller in which the driving motor for the controlling mechanism is mounted in a stationary fixture, instead of in the removable shell that houses the controlling mechanism. The cylindrical aluminum casing 88 that houses the driving motor is constructed at its front end in the same manner as the shell 33, with the exception that a central aperture for the shaft that is driven by the shaded pole motor is provided in the Bakelite plates 35 and 36. In addition, the casing 88 differs from the shell 33 in that it is considerably longer and in that the aperture 89 for the entry of the lead-in wires is located at the bottom instead of at the rear.

The die cast zinc cover 90 for the rear end of the cylindrical casing 88 is provided with a peripheral lug 91 to receive a screw for securing the cover 90 to the casing. In addition, it has a central internal boss 92, which is provided with a bore deep enough to receive rotatably the reduced end 93 of the main driven shaft 94 of the fixed driving unit.

The construction of the driving unit of Figure 15 is similar to that of Figure 3, and the long spacing posts 54 in Figure 15 are screwed to the rear cover 90 of the casing in the same manner as the posts 54 of Figure 3 are screwed to the outer bearing plate 56. The bearing bracket 57 in Figure 15 is likewise screwed to the rear cover 90 and a bearing for the secondary shaft 65 is provided in the cover 90 in the same manner as in the outer bearing plate 56 of Figure 3.

The remaining structure of the driving unit is the same as the structure of the driving unit in Figure 3 with the following exceptions: the stub shaft 95 of the secondary gear 72 does not extend through the bearing plate 96, but has a pinion 97 pressed thereon between the gear 72 and the bearing plate. Instead of driving the outer housing of an overrunning clutch, as the pinion 74 of Figure 3 does, the pinion 97 drives a gear 98 that is fixed upon the main driven shaft 94 of the driving unit.

In the device of Figure 15, the dial shaft extending outward from the controlling mechanism through the center plate 46 is very short and is not provided with an overrunning clutch like the dial shaft of Figure 3. The center plate 46, of course, has no spacing posts attached thereto, and the structure of the device from the center plate 46 to the circular Bakelite block 40 is the same as in Figure 3, with the exception that the construction at the rear end of the shaft on which the cams are mounted is slightly different in Figure 15.

This shaft terminates in a short squared portion 99 protruding from the rear cam upon which is fixed a stamping 100 (see Figure 17) that forms part of an overrunning clutch similar to the overrunning clutch of Figure 12, including a ball 101 and spring 102. Surrounding these members of the overrunning clutch is a cylindrical housing 103, having a cylindrical boss 104 protruding from its rear side, which is journaled in the bearing socket 105 of the circular Bakelite block 40. A metal clip 106, similar to the metal clip 49 of Figure 6, is employed to prevent the boss 104 from getting out of the bearing socket 105 (see Figure 16) through the open side thereof. A retaining cup 108 is fitted over the cylindrical housing 103 to retain the spring and roller. The circular Bakelite block 40 in Figure 15 is provided with a central bore through which the protruding squared end of the main driven shaft 94 of the driving unit enters a square socket in the boss 104 of the overrunning clutch housing. Thus the plugging in of the driving connection is accomplished simultaneously with the plugging in of the electrical connections.

The device of Figures 14 and 15 can obviously be manipulated in the same manner as the device of Figure 3 in the controlling of an automatic machine. After the controlling mechanism has been plugged into the fixed driving unit, the indicator 79 can be rotated manually the slight amount necessary for the closing of the contact that makes the circuit through the coil 60 of the shaded pole motor. In addition, the operation of the device can be hastened at any time by manual rotation of the indicator 79 in a forward direction. The overrunning clutch permits manual forward rotation of the controlling mechanism, but prevents manual backward rotation thereof.

Figure 18 shows a removable unit containing controlling mechanism and a driving motor, which may be substituted for the removable unit of Figures 1 and 3. From the center plate 46 rearward the construction of the unit of Figure 18 is the same as that shown in Figure 3. Screwed to the center plate 46 are four spacing posts 109 which support a rear bearing plate 55. A second set of four spacing posts 110 are screwed to the spacing posts 109 in the same manner as the spacing posts 54 are screwed to the spacing posts 53 in Figure 3. Screwed to the ends of the spacing posts 110 is an outer bearing plate 56.

A dial shaft 111 is journaled in the bearing plates 55 and 56 and is driven by means of a coil spring 112 having its inner end secured to the shaft and its outer end secured to a lug on the inner bearing plate 55. Spring plates 113 are held upon a collar 114 (see Figure 20) fixed on the shaft, by means of a flange 115 surrounding the inner end of the collar, and these plates exert axial pressure upon a driving gear 116, to hold it against a flange 117 surrounding the outer end of the collar 114 with sufficient friction to prevent the gear from rotating on the collar. Thus the gear 115 is driven from the dial shaft by means of a friction drive. It is used to transmit power to a clockwork mechanism mounted upon the bearing plates 55 and 56, which is omitted from Figure 18 for the sake of clarity.

The dial shaft 111 extends inward only a short distance beyond the inner bearing plate 55 and its inwardly protruding end is squared. Fixed upon the squared end of the dial shaft is a socket 118 having a flange 119 surrounding its inner side integral with which is an inwardly projecting lug 120 formed by turning up a tongue on the flange. The main shaft 121 of the controlling mechanism also has a squared end protruding outward a slight distance from the bearing bushing 50, on which is fixed a socket 122 having a semi-annular flange 123 (see Figure 19) extending laterally from its outer surface. Riveted upon the outer surface of the semi-annular flange 123 is an annular resilient brass strip 124 having a portion 125 kicked outward to form an abutment for the lug 120.

Just outside of the outer bearing plate 56, the dial shaft 111 is provided with a short non-circular portion 126 on which there is fitted a steel disc 127 having a laterally projecting lug 128. Figure 21 shows a front view of the steel disc 127 and of the outer bearing plate 56 projecting from behind which the balance wheel 129 of the clock mechanism may be seen. A tube of brass 130 surrounds the shaft between the steel disc 127 and the indicator 79 for holding the steel disc upon the non-circular portion 126 of the shaft. Mounted for limited sliding movement on the outside of the outer bearing plate 56 is a bracket 131 having a lug 132 for engagement with the lug 128 on the steel disc 127.

The device of Figures 18 to 21 is in its inoperative condition when the steel disc 127 is in the position shown in Figure 21. The mechanism may then be started by counter-clockwise rotation of the indicator 79 through an angle of about 360°. When the indicator has been rotated in a counter-clockwise direction as far as it will go, the lug 128 on the steel disc 127 has hit against the under-side of the lug 132 on the bracket 131 and lifted the bracket upward to the extent of its travel. By the counter-clockwise rotation of the dial shaft, the spring 112 is wound up, so that it begins to drive the dial shaft in a clockwise direction as soon as the operator has let go of the indicator 79. This manual rotation of the dial shaft does not move the main shaft 121 of the control mechanism nor its socket 122, but the lug 120 presses the resilient brass strip 124 inward as the dial shaft nears the completion of its counter-clockwise rotation. Then as the abutment of the lug 128 against the shiftable lug 132 causes the dial shaft to come to a stop, the brass strip 124 springs into its original position relative to the associated lug 120.

The slow clockwise rotation of the dial shaft, which occurs as the spring 112 drives the clockwork, causes a simultaneous clockwise rotation of the main shaft 121 of the controlling mechanism through the agency of the lug 120 and resilient brass strip 124. By manual movement of the indicator 79 in a clockwise direction, the operation of the controlling mechanism can be hastened at any stage thereof. Since the brass strip 124 and collar 122 can be rotated only in one direction, by means of the lug 120, it is impossible for the operator to damage the controlling mechanism by manually rotating it backward. Whenever the dial shaft 111 is rotated by hand, the driving gear 116 remains in mesh with the clockwork and slips upon the collar 114.

The advantage of a demountable sequential controller, constructed in accordance with the invention, is that it can be removed quickly from the automatic machine for inspection or repair, or for replacement by a controller constructed to put the machine through a different cycle of operations. Since the controller is usually a piece of mechanism constructed much more delicately than the machine that it controls, it is highly desirable for the controller to be easily demountable for removal to a suitable repair shop. When plug-in connectors, arranged in accordance with the invention are employed, the re-connection of the controller with the automatic machine is quickly and simply accomplished in the manner illustrated in Figure 5. Even though the number of electrical connections between the controller and the machine is great, no confusion can arise, the plug-in connectors being preferably arranged unsymmetrically to prevent the controller from being mounted in the wrong position.

When the main driven shaft is journaled in a pair of spaced supports, as in the device of Figure 15, it is desirable that the main shaft be driven at a point between the supports instead of having an overhanging driven portion protruding from one of the supports, in order that the maximum spacing of the shaft bearings may be secured. Location of the drive shaft and prime mover between the supports in which the main driven shaft is journaled, also makes it possible for the unit to be more compact.

In a device such as that of Figure 3 in which a dial shaft extends outward from the controlling mechanism, it is desirable for the drive shaft and prime mover to be located alongside of the dial shaft. The prime mover cannot very well be mounted upon the dial shaft, because the dial shaft ordinarily makes only one revolution during the operation of the automatic machine, while the prime mover makes many revolutions. Location of the prime mover at the opposite end of the unit would be inconvenient, because the prime mover would make it difficult to connect up the many wires that lead from the contact arms to the rear end of the unit.

When the controlling mechanism is movable independently of the prime mover by manual rotation of the dial shaft, it is, of course, out of the question for the prime mover to be mounted upon the dial shaft. The arrangement illustrated in the drawings in which the drive shaft, on which the prime mover is mounted, is adjacent and substantially transverse to the main driven or dial shaft, makes the construction compact and convenient. This construction is much less expensive to build than a device in which the prime mover is mounted upon a hollow shaft surrounding the main driven shaft or dial shaft.

Changes in the apparatus illustrated in the drawings may be made and various devices embodying the substance of the invention may be constructed to meet various requirements.

I claim:

1. In a sequential controller, in combination, electric controlling mechanism, a shaft connected therewith and extending therefrom, a drive shaft adjacent the first-named shaft and substantially transverse thereto, a driving means mounted on the drive shaft, means for transmitting power from the drive shaft to the controlling mechanism, a common demountable support for the drive shaft and controlling mechanism, a set of connectors connected with the controlling mechanism, mounted on the opposite side of the support from the dial shaft, and a set of fixed connectors for registry with the other connectors.

2. In a sequential controller, in combination, a housing, electric controlling mechanism therein, a shaft connected with the mechanism and extending to one end of the housing, a drive shaft mounted in the housing adjacent the first-named shaft and substantially transverse thereto, a driving means in the housing and including a driving member mounted on the drive shaft, means for transmitting power from the drive shaft to the controlling mechanism, a set of connectors connected with the controlling mechanism and mounted at the other end of the housing, and a set of fixed connectors for registry with the connectors connected with the controlling mechanism.

3. A sequential controller for an automatic machine housed in a cabinet comprising, in combination, a housing removable through a wall of the cabinet, electric controlling mechanism and a driving motor therefor in the housing, a set of plug-in connectors connected with the controlling mechanism and mounted at the inner end of the housing, and a set of fixed plug-in connectors to register with the plug-in connectors connected with the controlling mechanism.

4. A sequential controller for an automatic machine housed in a cabinet comprising, in combination, a housing having arranged therein electric controlling mechanism removable through a wall of the cabinet, a shaft extending from the controlling mechanism and through the wall of the cabinet, a drive shaft for the controlling mechanism having a driving connection with the first named shaft, a motor in said housing driving the drive shaft, a set of connectors connected with the controlling mechanism and mounted at the inner end thereof, and a set of fixed connectors for registry with the conectors connected with the controlling mechanism.

5. A sequential controller for an automatic machine housed in a cabinet comprising, in combination, a housing removable through a wall of the cabinet, electric controlling mechanism in the housing having a shaft extending through the wall of the cabinet, a set of prong connectors connected with the controlling mechanism and mounted at the inner end of the housing, a plug-in driven connection, through which the controlling mechanism is driven, associated with the prongs, and a set of fixed contactor sockets and a fixed plug-in driving connection to register with the prongs and plug-in driven connection.

6. In a sequential controller, in combination, a housing, electric controlling mechanism in the housing, a set of plug-in connectors connected with the controlling mechanism and mounted at one side of the housing, a plug-in driven connection, through which the controlling mechanism is driven, associated with the plug-in connectors, and a set of fixed plug-in connectors and a fixed plug-in driving connection for registry with the other plug-in connectors and the plug-in driven connection.

7. A sequential controller for an automatic machine housed in a cabinet comprising, in combination, electric controlling mechanism removable through a wall of the cabinet, a shaft extending from the controlling mechanism through the wall of the cabinet, a set of plug-in connectors connected with the controlling mechanism and mounted at the inner end thereof, a plug-in driven connection, through which the controlling mechanism is driven, associated with the plug-in connectors and a set of fixed plug-in connectors and a fixed plug-in driving connection for registry with the other plug-in connectors and the plug-in driven connection.

8. A sequential controller comprising a housing, a set of yielding contacts in the housing, a corresponding set of cams in the housing arranged to open and close said contacts, a shaft driving said cams which has outside the housing a device for turning it manually, and a motor within the housing having a one-way drive device connecting it to the cam-driving shaft, whereby the cams can be advanced independently of the motor and are then driven by the motor.

9. A sequential controller comprising a housing, a set of yielding contacts in the housing, a corresponding set of cams in the housing arranged to open and close said contacts, a shaft driving said cams which has outside the housing a device for turning it manually, an electric motor within the housing having a one-way drive device connecting it to the cam-driving shaft, whereby the cams can be advanced independently of the motor and are then driven by the motor, and a circuit for said motor controlled by one of said cams, whereby advancing the cam-driving shaft closes the motor circuit.

10. A sequential controller comprising a housing, a set of yielding contacts in the housing, a corresponding set of cams in the housing arranged to open and close said contacts, a shaft driving said cams which has outside the housing a device for turning it manually, an electric motor within the housing having a one-way drive device connecting it to the cam-driving shaft, whereby the cams can be advanced independently of the motor and are then driven by the motor, and a circuit for said motor controlled by one of said cams, whereby advancing the cam-driving shaft closes the motor circuit, the motor being of a self-starting type such that closing the motor circuit as described starts the controller in operation.

11. A sequential controller comprising a housing, a set of yielding contacts in the housing, a corresponding set of cams in the housing arranged to open and close said contacts, a shaft driving said cams which has outside the housing a device for turning it manually, and a motor within the housing having a one-way drive device connecting it to the cam-driving shaft, whereby the cams can be advanced independently of the motor and are then driven by the motor, the contacts being arranged in pairs operated by the cams and the cams being so formed that the contacts of each pair are separated by camming action on one contact of the pair and are closed by camming action on the other contact of the pair.

12. A sequential controller comprising a housing, a set of yielding contacts in the housing, a corresponding set of cams in the housing arranged to open and close said contacts, a shaft driving said cams which has outside the housing a device for turning it manually, and a motor attached to the housing having a one-way drive device connecting it to the cam-driving shaft, whereby the cams can be advanced independently of the motor and are then driven by the motor.

13. A sequential controller comprising a housing, a set of yielding contacts in the housing, a corresponding set of cams in the housing arranged to open and close said contacts, a shaft driving said cams which has outside the housing a device for turning it manually, an electric motor attached to the housing having a one-way drive device connecting it to the cam-driving shaft, whereby the cams can be advanced independently of the motor and are then driven by the motor, and a circuit for said motor controlled by one of said cams, whereby advancing the cam-driving shaft closes the motor circuit, the motor being of a self-starting type such that closing the motor circuit as described starts the controller in operation.

REX EARL BASSETT, Jr.